Fig. 10

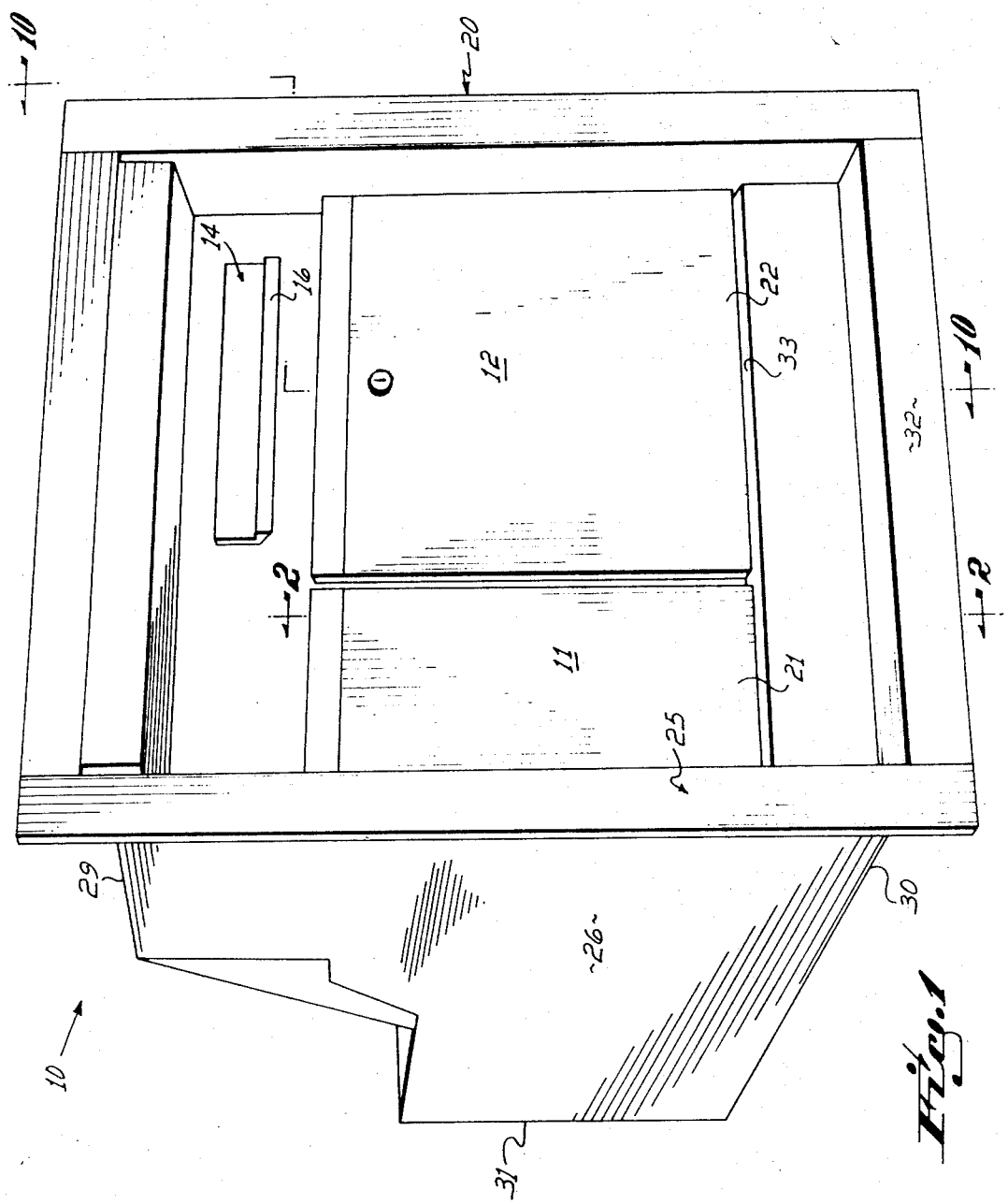

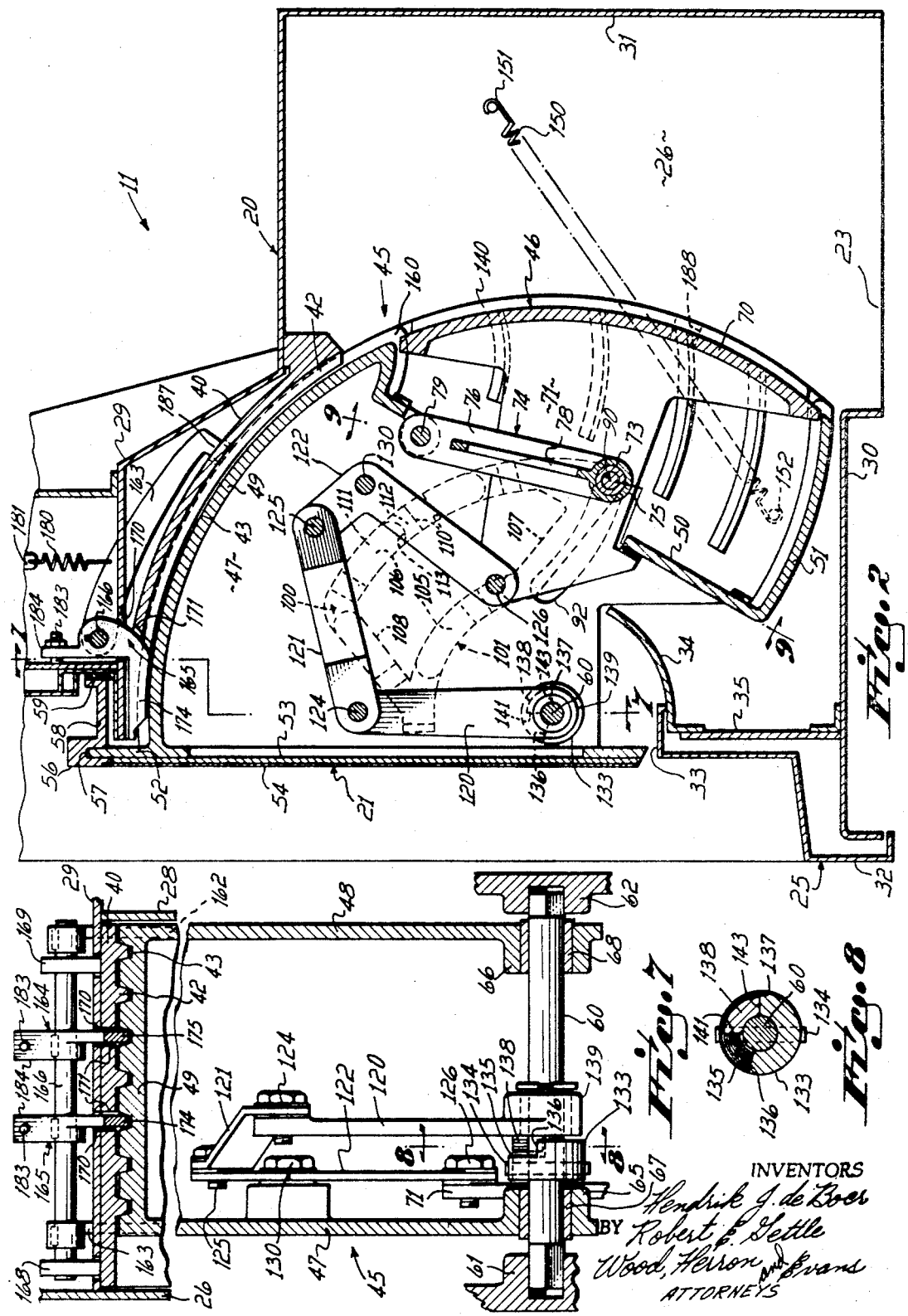

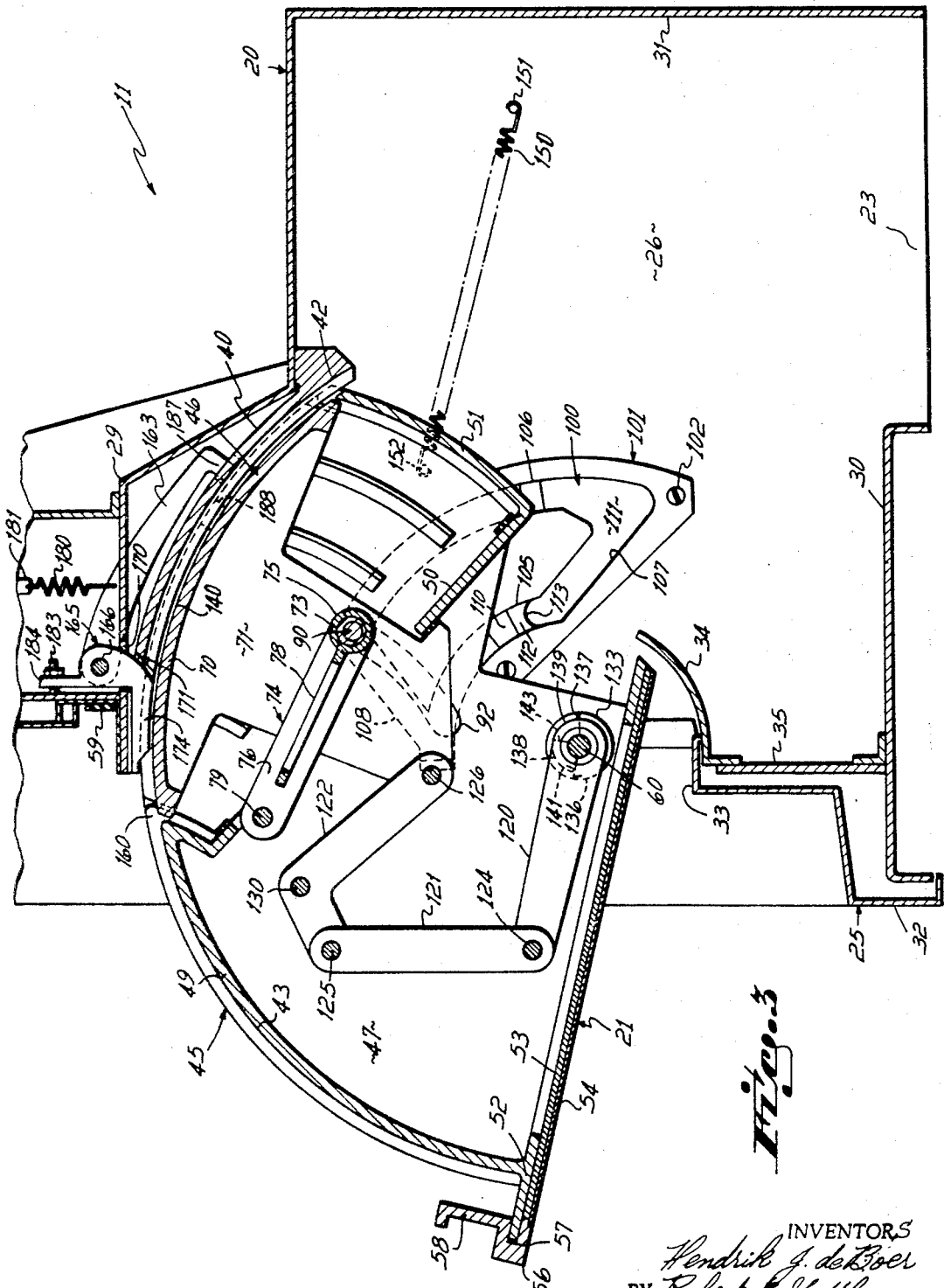

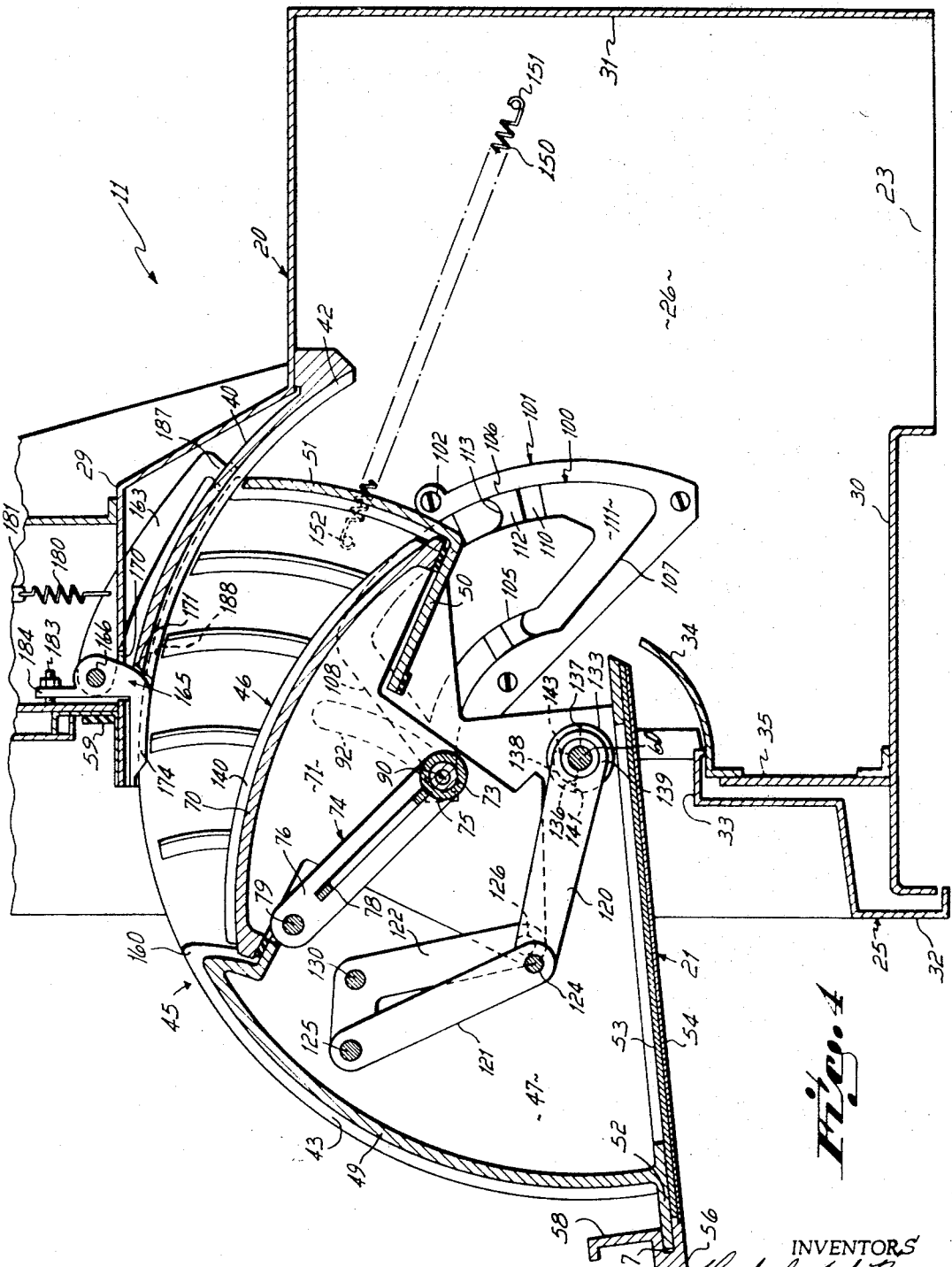

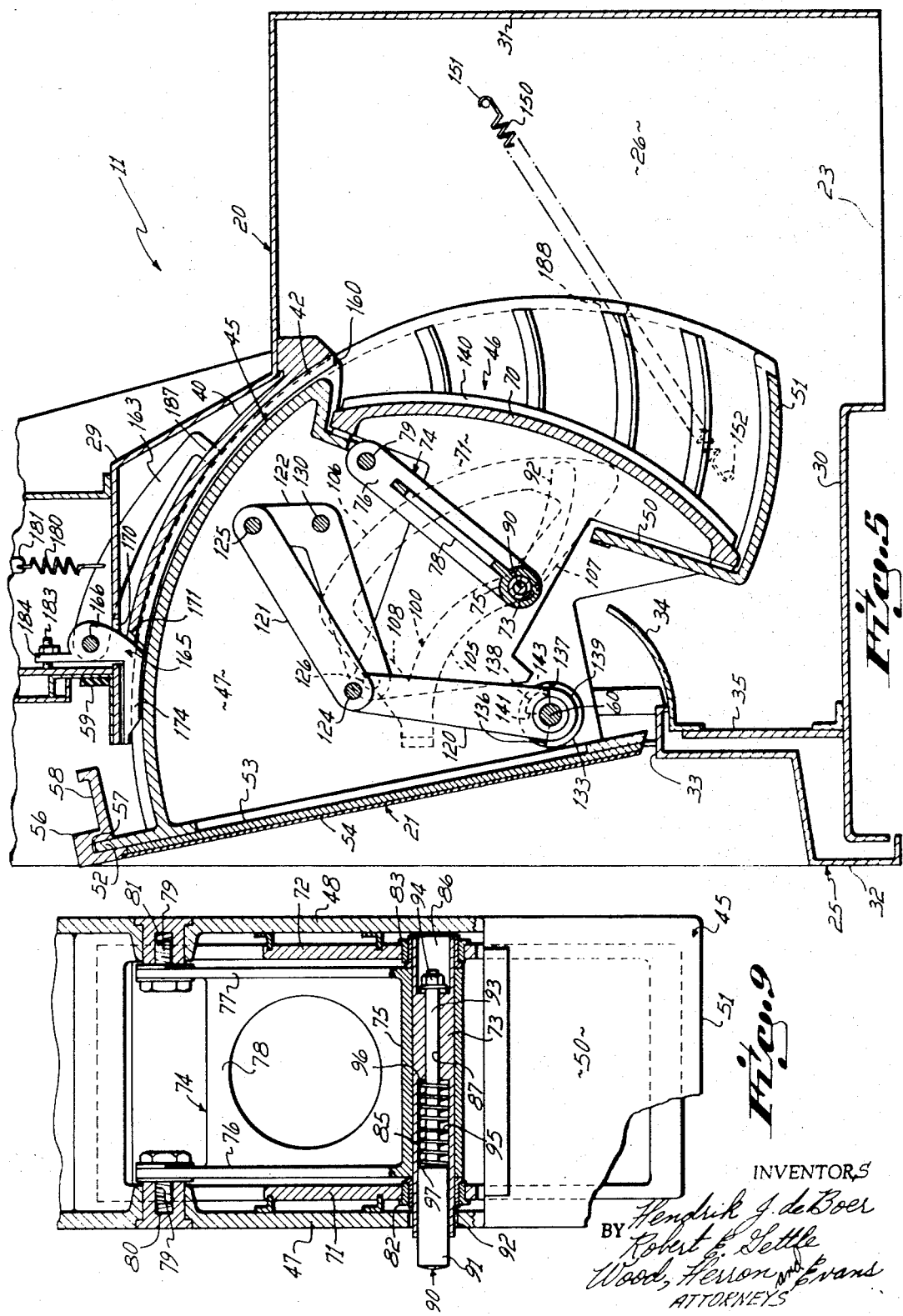

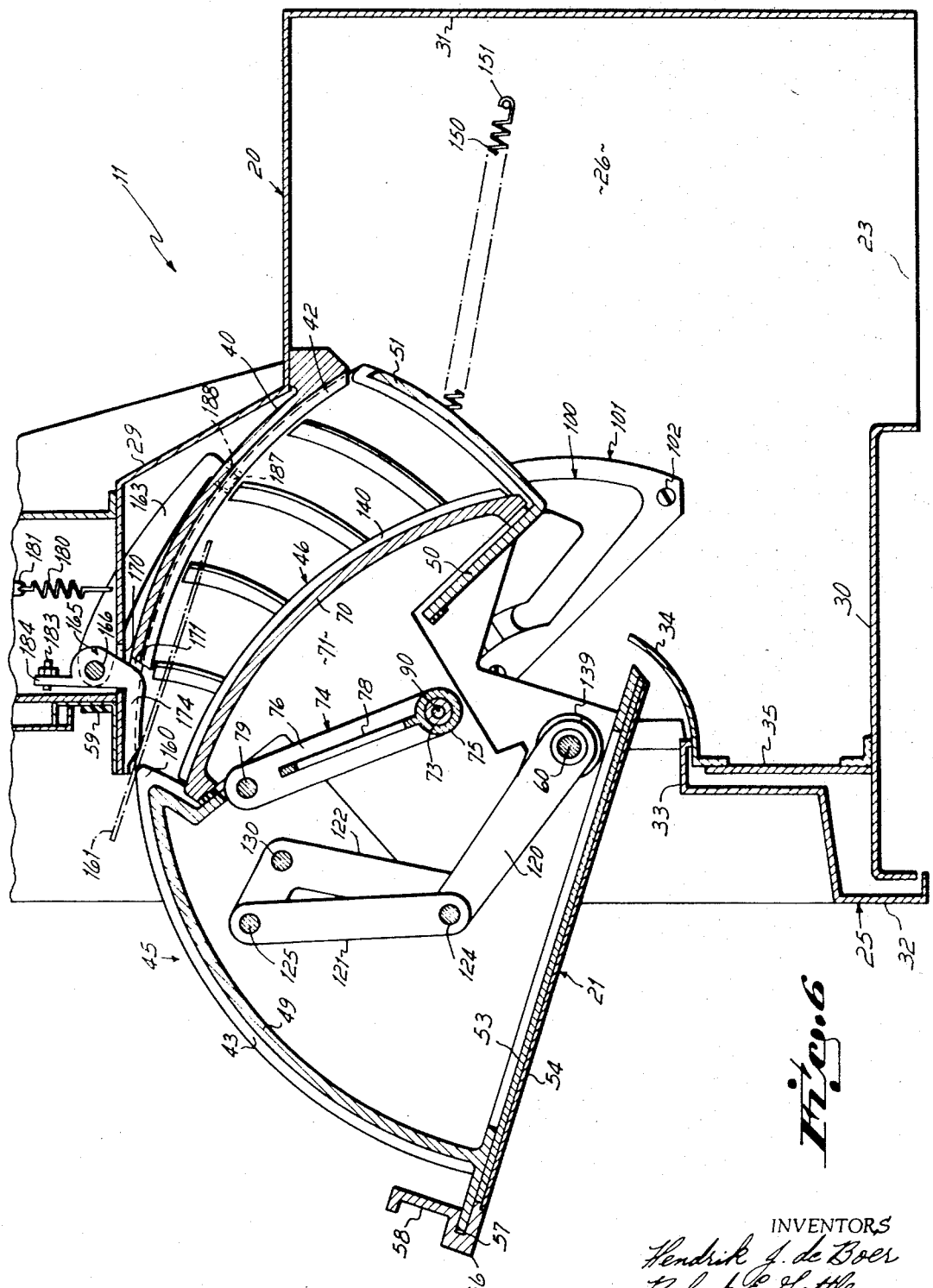

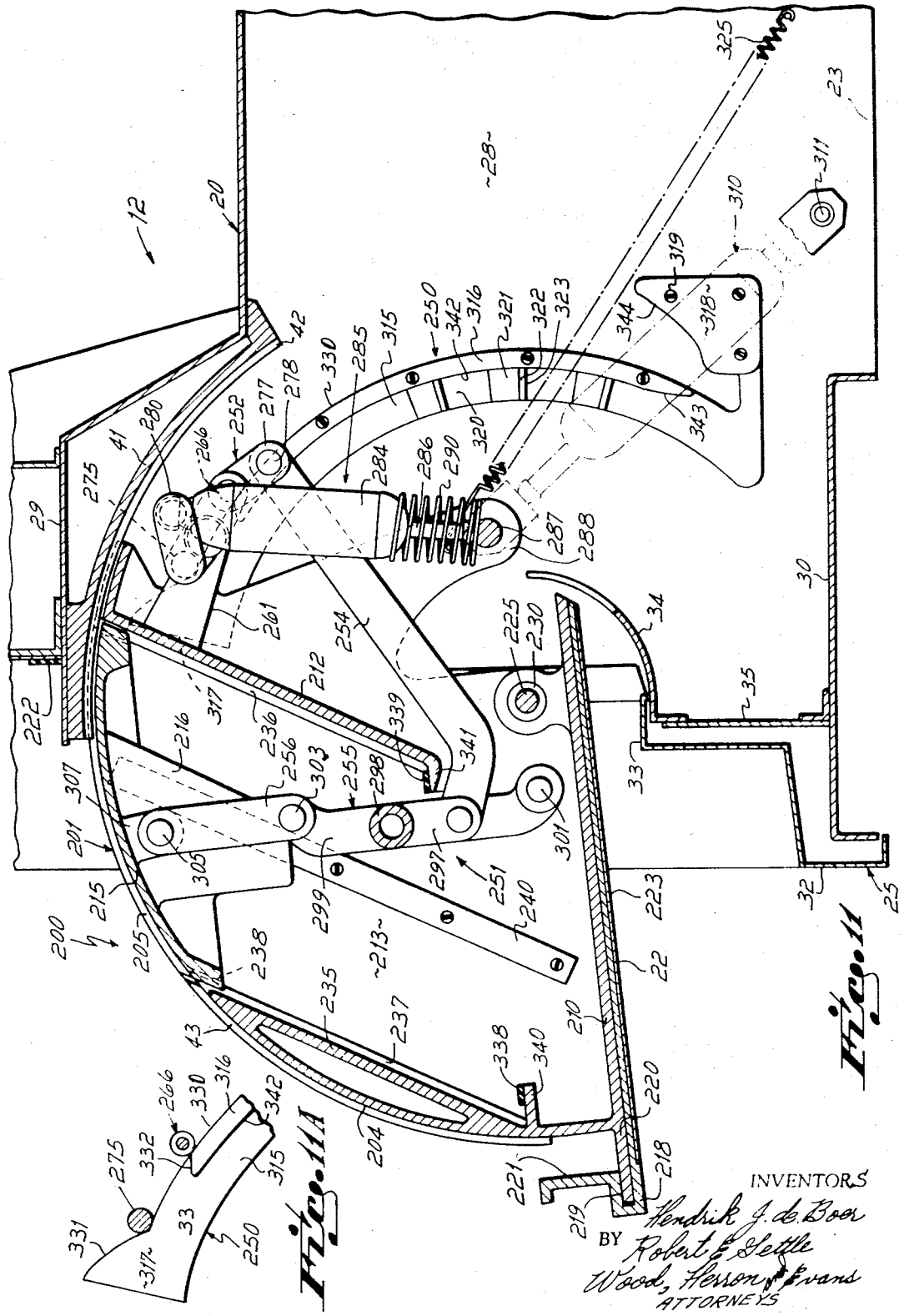

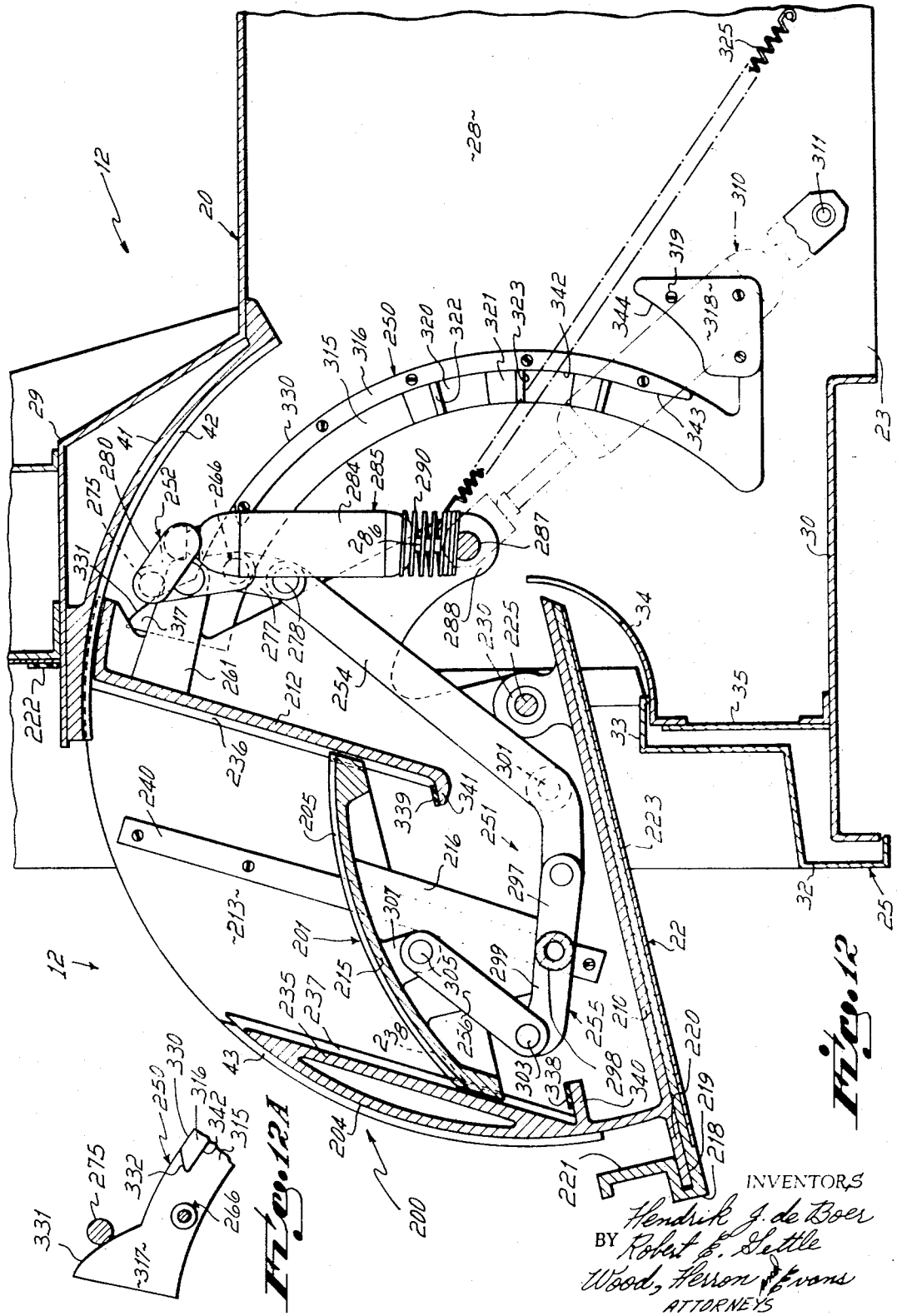

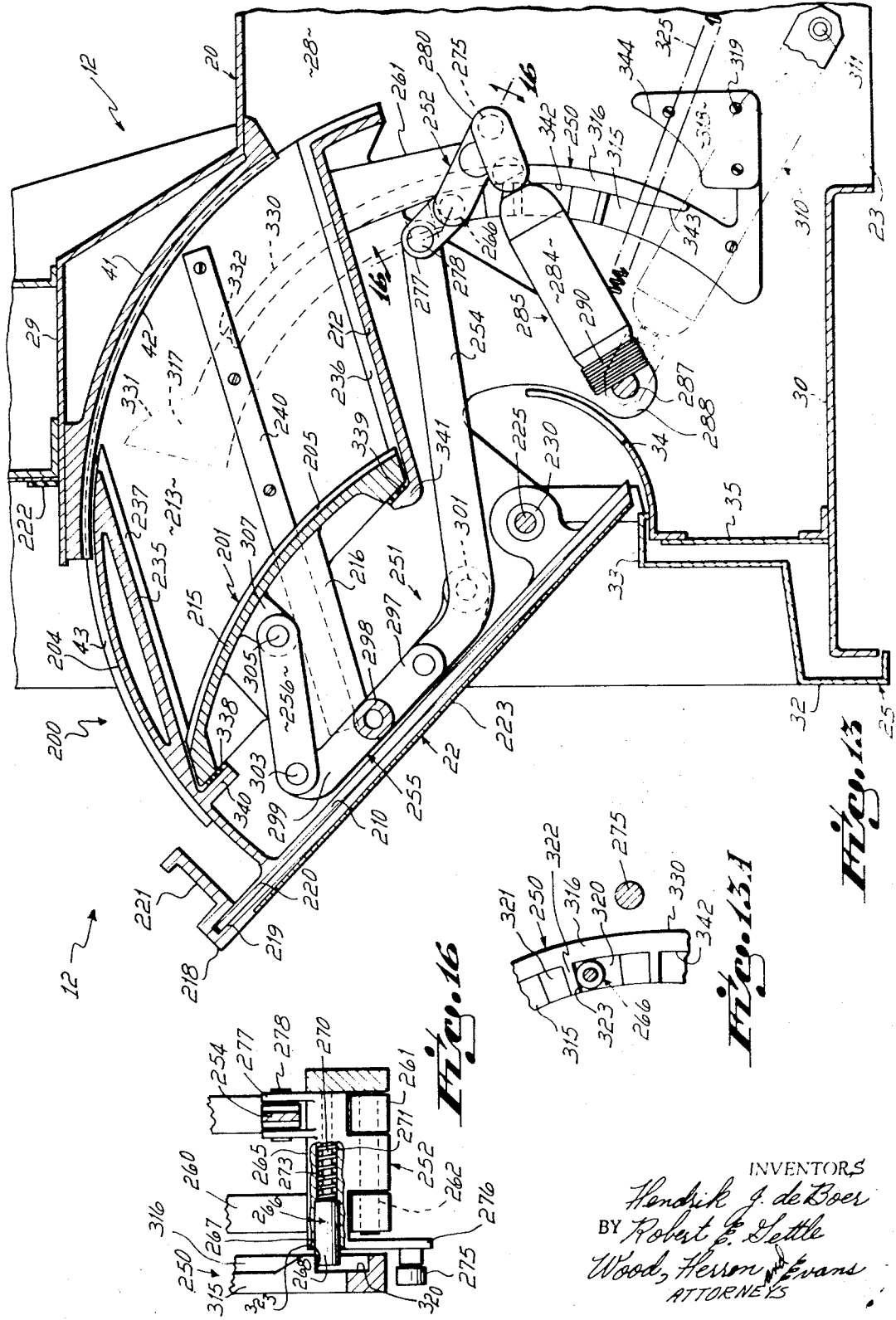

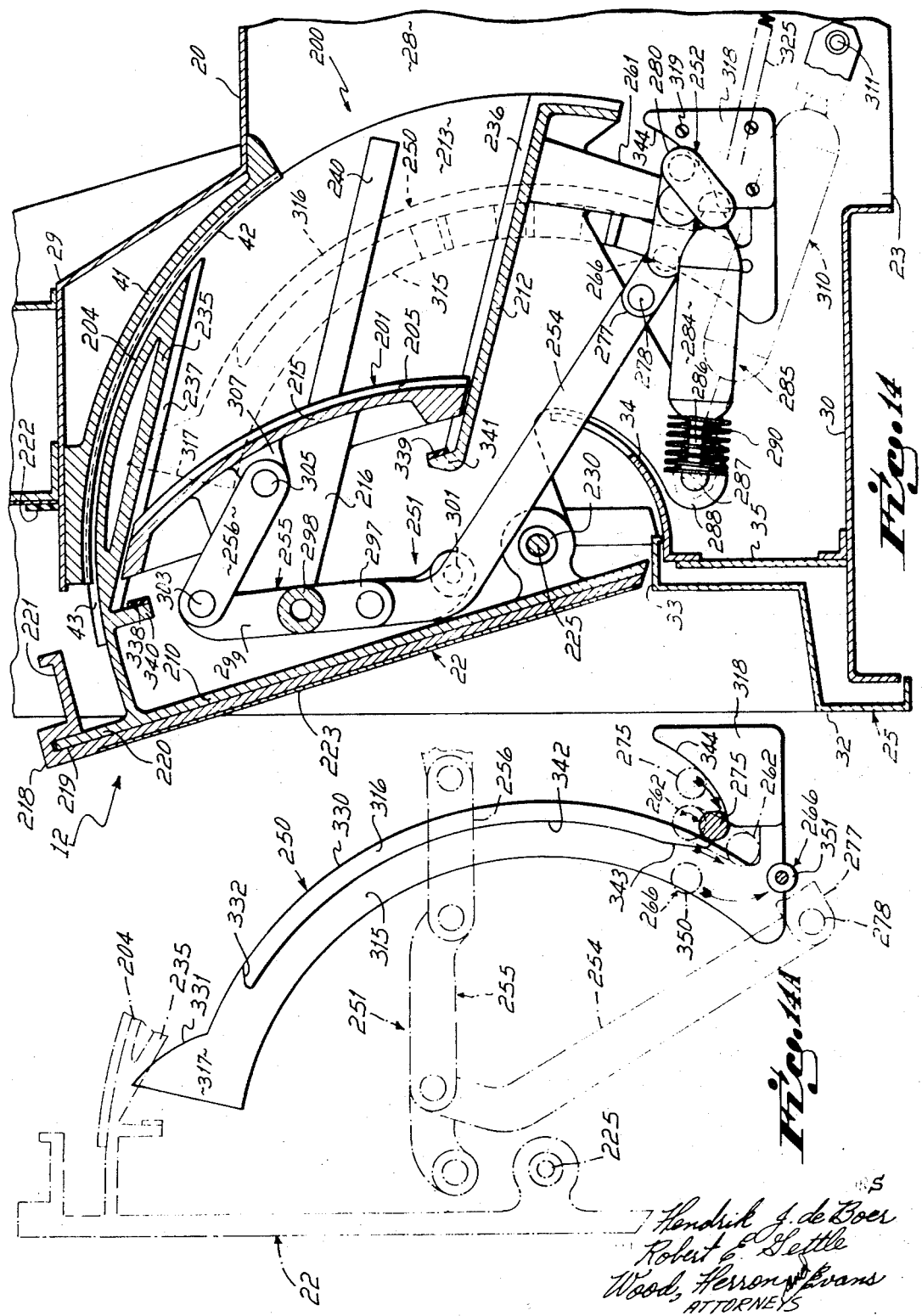

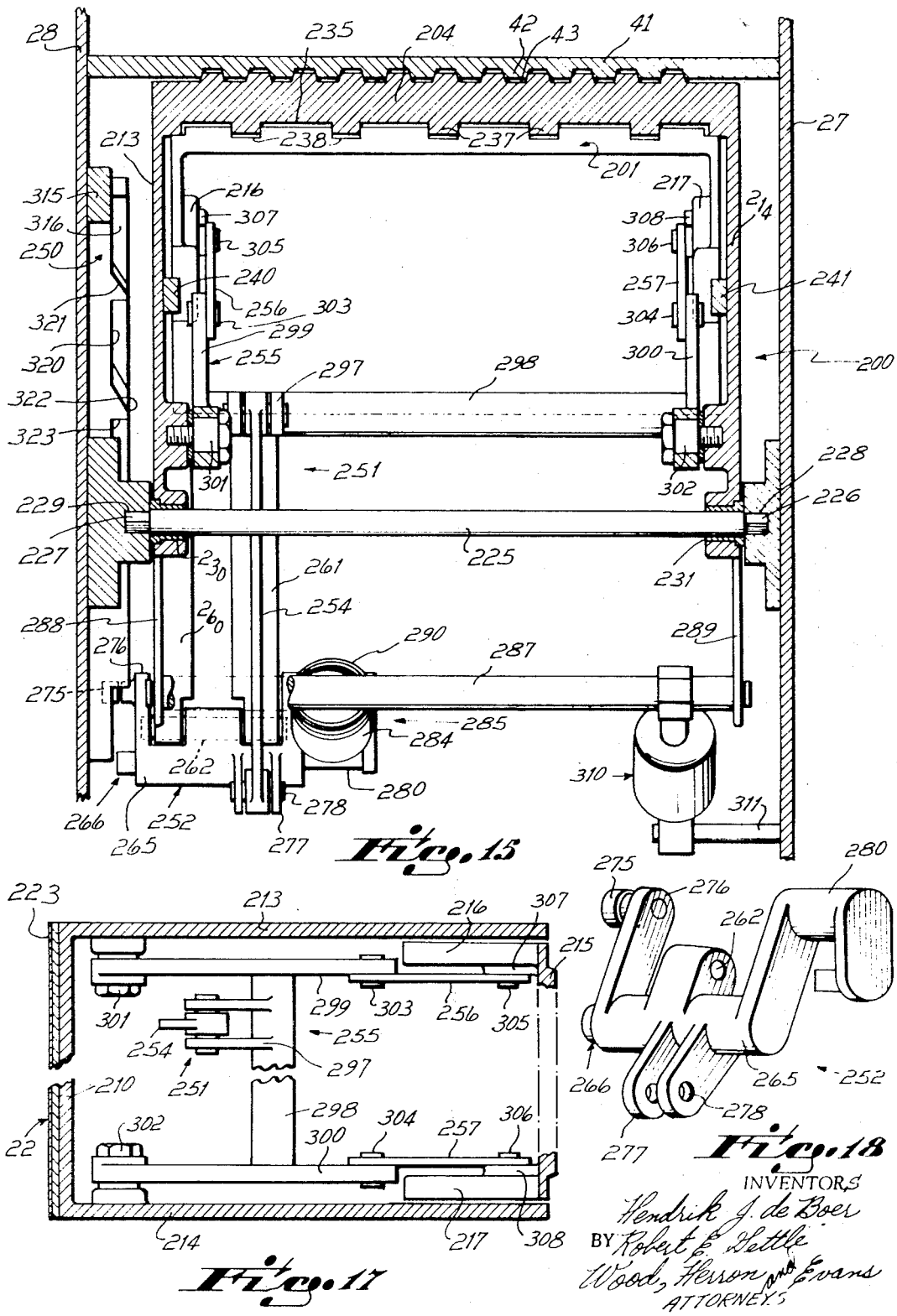

United States Patent Office 3,465,955
Patented Sept. 9, 1969

3,465,955
NIGHT DEPOSITORY
Hendrik J. de Boer, Fairfield, and Robert E. Gettle, Hamilton, Ohio, assignors to The Mosler Safe Co., Hamilton, Ohio, a corporation of New York
Filed Sept. 11, 1967, Ser. No. 666,886
Int. Cl. B65g *11/04;* B65d *91/00*
U.S. Cl. 232—44
22 Claims

ABSTRACT OF THE DISCLOSURE

A bank depository having a movable plunger forming the bottom of the depository receptacle. The plunger is withdrawn upon opening of the depository and is extended to positively eject the contents of the receptacle when the depository is closed. An improperly located envelope in the depository actuates a lock to prevent closing of the depository and tearing or shredding of the envelope.

Background of the invention

This invention relates to bank depositories or so called "night depositories" which are used for customer deposits after banking hours. Customarily, these depositories are provided with one or more openings located in an outside wall of a building. These openings communicate with an inclined chute which empties into a receiving safe inside the building. In using such a depository a customer desiring to make a deposit after normal banking hours, places his deposit in a bag or an envelope, opens a key operated door in the case of the bag depository—keys for which are supplied only to customers who regularly make deposits after banking hours—and inserts his deposit into the depository. The following day, the bag or envelope is retrieved from the receiving safe and its contents processed in the usual manner of other regular deposits.

Necessarily, night depositories must be very secure since they serve as entrance ways or doors to vaults or safes which at times, contain large amounts of money and are, therefore, subject to burglarizing. In fact, in the past, thieves have developed ingenious fishing or trapping techniques for removing deposits from prior art depositories.

A primary objective of this invention has been to provide a depository which has greater security than prior art depositories and which is much less expensive to manufacture. To this end, the depository of this invention is operable to preclude deposits from being withdrawn in any manner, even by a thief having a key to the depository, after the customer has placed a deposit in the depository and closed the door.

One aspect of the present invention is predicated upon the concept of providing a depository having a hopper floor or bottom wall in the form of a movable plunger effective in an extended position to block the chute entrance until the depository hopper is nearly completely open, after which the plunger drops and a hopper rear wall blocks the chute entrance. When the hopper is closed, the plunger remains withdrawn until the hopper is very nearly completely closed. Subsequently, during the last portion of the closing movement, the plunger is raised so as to positively eject articles from the hopper receptacle and force them to fall into the mouth of a chute leading to a safe. When the hopper is opened, a stationary frame plate acts as a wiper element to force any adhered articles off of the extended floor of the hopper receptacle.

More particularly, the present invention contemplates a night depository having an envelope receiving hopper and a bag receiving hopper. Each of these hoppers includes a door providing an opening to a passageway and a chute leading to a receiving safe. Each of the hoppers further includes a movable plunger which forms the floor portion of the hopper receptacle and is adapted to be shifted upon movement of the door associated with the hopper so as to provide a baffle extending across the passageway upon opening of the door until the rear wall of the receptacle is positioned to serve as a baffle. Only then is the plunger lowered so as to expose the hopper receptacle. Upon closing of the door, the plunger positively ejects articles from the receptacle into the depository chute.

Extension and retraction of each of the hopper plungers is controlled by a cam attached to the depository housing and interconnected to the plunger by a linkage system. This cam and linkage system cycles plunger so that it only is retracted when the depository door is very nearly completely opened and is only extended when the door is very nearly completely closed. Consequently, it is impossible to use hooks or adhesive to maintain articles in contact with the plunger as the door is opened so as to withdraw articles from the depository through the front door. Such articles are all wiped off of the extended plunger prior to retraction of the plunger.

It is to be understood that while a preferred embodiment of the depository includes both a bag receiving section and an envelope receiving section, these sections function independently of one another and can be used independently if desired.

Another important aspect of this invention is predicated upon the concept of an interlock operable to prevent closing of the envelope depository in the event of only partial insertion of an envelope into the depository. One of the most common problems with envelope depositories occurs as a consequence of a customer only partially inserting an envelope into the depository receptacle so that upon subsequent closing of the depository door, the envelope becomes jammed and may even be shredded before it can be extracted.

The envelope interlock of this invention comprises a cam located in the path of travel of an improperly located envelope and operable to move a locking abutment into the path of travel of the envelope hopper so as to lock the hopper against further closing until the door is reopened and the envelope is repositioned.

These and other objects and advantages of the present invention will be more readily apparent from the following detailed description illustrating a preferred embodiment of the invention. As shown in the drawings:

FIGURE 1 is a perspective view of a night depository incorporating the invention of this application.

FIGURE 2 is a cross-sectional view through the envelope depository section of the night depository unit taken along line 2—2 of FIGURE 1 and illustrating the envelope depository hopper in a fully closed position.

FIGURE 3 is a cross-sectional view similar to that of FIGURE 2, but illustrating the envelope depository hopper in a partially opened position.

FIGURE 4 is a view similar to FIGURE 3 but illustrating the envelope depository hopper in a completely opened position.

FIGURE 5 is a view similar to FIGURE 4 but illustrating the envelope depository hopper in a partially closed position.

FIGURE 6 is a cross-sectional view of the envelope depository hopper in a partially closed position with the envelope interlock actuated to preclude further closing of the hopper.

FIGURE 7 is a cross-sectional view through the front of the envelope depository section of the unit taken along line 7—7 of FIGURE 2.

FIGURE 8 is a cross-sectional view of the envelope depository hopper control shaft taken along line 8—8 of FIGURE 7.

FIGURE 9 is a cross-sectional view through the envelope depository section of the unit taken along line 9—9 of FIGURE 2.

FIGURE 10 is a cross-sectional view through the bag depository section of the unit taken along line 10—10 of FIGURE 1.

FIGURE 11 is a cross-sectional view similar to FIGURE 10 but illustrating the bag depository hopper in a partially open position.

FIGURE 11A is a diagrammatic illustration of the relative positions of the cam and cam followers in FIGURE 11.

FIGURE 12 is a cross-sectional view similar to FIGURE 11 illustrating the bag depository hopper in a fully open position.

FIGURE 12A is a view similar to FIGURE 11A illustrating the relative positions of the cam and cam followers in FIGURE 12.

FIGURE 13 is a cross-sectional view similar to FIGURE 12 but illustrating the bag depository hopper in a partially closed position.

FIGURE 13A is a view similar to FIGURE 12A illustrating the relative positions of the cam and cam followers in FIGURE 13.

FIGURE 14 is a cross-sectional view similar to FIGURE 13 illustrating the bag depository hopper in a more fully closed position.

FIGURE 14A is a diagrammatic view illustrating the relative position of the cam and cam followers during the final closing portion of the bag depository hopper cycle.

FIGURE 15 is a cross-sectional view through the front of the bag depository section of the unit taken on line 15—15 of FIGURE 10.

FIGURE 16 is a cross-sectional view through the cam and cam follower support bracket taken along line 16—16 of FIGURE 13.

FIGURE 17 is a cross-sectional view through the bag depository hopper taken on line 17—17 of FIGURE 10.

FIGURE 18 is a perspective view of the cam follower support bracket of the bag depository section of the unit.

Referring to FIGURE 1, there is illustrated the inventive night depository 10 of this invention. This unit comprises an envelope depository section 11, a bag depository section 12 and an envelope dispenser 14. The envelope dispenser forms no part of the invention of this application and has therefore not been illustrated in detail. Basically the dispenser simply serves as a reservoir for envelopes which is operable to dispense envelopes one at a time upon pulling of the handle 16 of the dispenser forwardly.

As best shown in FIGURES 1 and 2, the preferred form of night depository unit 10 embodying the principles of the present invention includes a frame 20 adapted to be mounted over an opening in an exterior wall of a bank or other commercial establishment. The frame 20 has two horizontally spaced door openings normally closed by a bag depository hopper door 22 and an envelope depository hopper door 21. These two front frame openings communicate through the hoppers with inclined chutes (not shown) connected to a bottom opening 23 at the rear of the frame so as to connect the depository to a suitable receiving safe disposed within the building. While the particular embodiment shown is a dual purpose unit, i.e., one adapted to receive both envelope deposits and bag deposits, it is to be understood that either the envelope receiving section or the bag receiving section can be used separately if desired.

Figure 10:
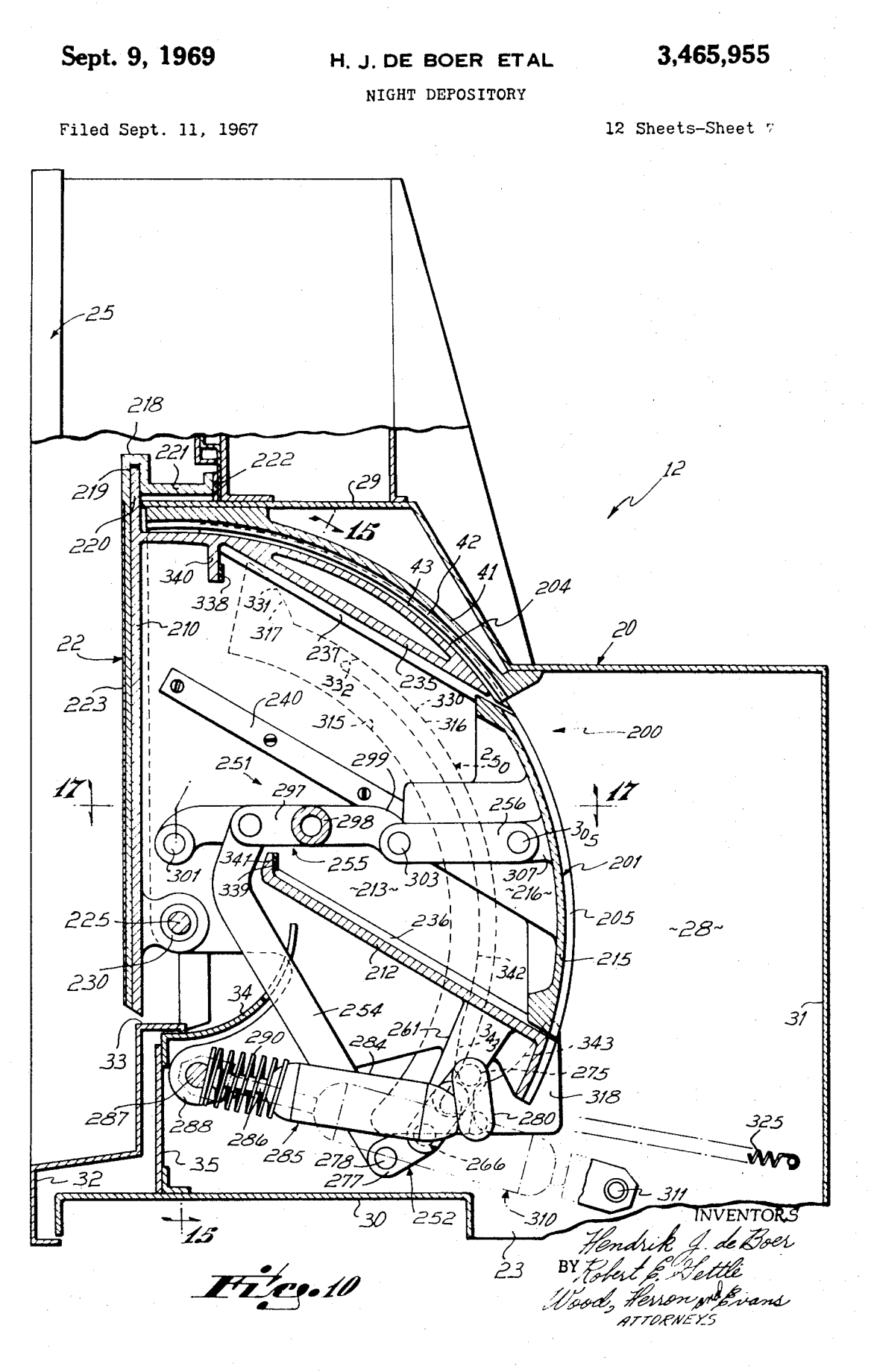

The depository frame 20 comprises an outer rectangular frame 25, a pair of side walls 26, 27, a divider wall 28 (FIGURE 10), a top wall 29, a bottom wall 30, and a rear wall 31. The rectangular outer frame section 25 fits over and surrounds the opening in the exterior wall of the building in which the depository is mounted. From the rectangular section 25, the side walls 26, 27, the divider wall 28, the top wall 29, and the bottom wall 30 all extend rearwardly through the building opening. The bottom aperture or opening 23 is located at the rear of the bottom wall 30 and opens into an inclined chute (not shown) which leads to a safe (not shown) located within the building.

As may be seen most clearly in FIGURE 2, the bottom horizontal bar 32 of the rectangular frame 25 is generally Z-shaped in cross section and has a rearwardly extending horizontal flange 33 along its upper edge. This flange 33 overlaps an upwardly and rearwardly extending arcuate frame bar 34 of a vertical bracket 35. The bracket 35 extends for the full width of the depository unit between the side frame plates 26, 27 and functions as a security bar to preclude access to the depository opening 23 from beneath the hopper.

A pair of upper arcuate frame plates 40, 41 are secured to the underside of the top frame plate 29 in juxtaposition to the tops of the envelope depository hopper 11 and the bag depository hopper 12 respectively. As is explained more fully hereinafter, these arcuate frame plates cooperate with the arcuate tops of the depository hopper to preclude withdrawal of articles from the safe or the chute through the depository unit. To this end, each of the arcuate frame plates 40, 41 has depending ribs 42 along its bottom surface which fit into grooves 43 in the tops of the hoppers so as to preclude access to the interior of the depository unit through the clearance gap between the hoppers and the frame.

Envelope depository

The envelope depository 11 comprises a hopper 45 within which a slide or plunger 46 is slideably mounted. Both the hopper 45 and the plunger 46 are made from aluminum castings so that they are both relatively inexpensive parts to manufacture.

The hopper 45 comprises a pair of side walls 47, 48, a top arcuate wall 49, a discontinuous bottom wall 50, and a rear wall 51. A flange 52 extends laterally from the front edge of the side walls 47 and the top wall 49. This flange supports the front door 21 which consists of a cover plate 53 over which is mounted a thin layer of decorative sheet steel 54. An aluminum handle or bar 56 fits over the top of the flange 52. This handle is supported on the flange 52 by a slot 57 in its bottom edge which fits over the top edge of the door flange 52. An abutment bar 58 extends rearwardly from the handle 56 and is adapted to rest against a resilient cushion 59 when the hopper is in the closed position illustrated in FIGURE 2.

The hopper is mounted for pivotal movement about its lower front edge upon a support shaft 60. This shaft extends between and is nonrotatably supported within bosses 61, 62 of the side wall 26 and the divider plate 28 respectively, of the depository frame. To preclude rotation of the shaft 60 in the frame, square ends on the shaft are mounted in square recesses of the bosses.

The side walls 47, 48 of the hopper are provided with apertured bosses 65, 66 fitted with bushings 67, 68 respectively. These bushings rotatably support the hopper upon the shaft 60.

The plunger 46 is slideably mounted within the recess or receptacle defined by the bottom wall 50, the rear wall 51 and the side walls 47, 48 of the hopper 45. It comprises an arcuate top wall 70 and a pair of depending side walls 71, 72. As may be seen most clearly in FIGURE 2, the arcuate top wall 70 of the plunger forms a continuation of the arcuate top wall 49 of the hopper when the plunger is extended. In other words, the arcuate outer surface of the top wall 70 of the plunger 46 forms an arc of a circle having the same center as the arc defined by the outer surface of the top wall 49 of the hopper 45.

The plunger 46 is supported for sliding movement in the pocket or recess by a hollow shaft 73 and supporting bracket 74. The shaft 73 is supported and carried by the bracket 74 and in turn pivotally supports the side walls 71, 72 of the plunger. Otherwise expressed, the bracket 74 supports the shaft 73 which in turn supports the plunger 46.

As may be seen most clearly in FIGURE 9, the bracket 74 comprises a central hub section 75 from which a pair of side walls or arms 76, 77 extend. A web 78 interconnects these side walls. At its upper end (as viewed in FIGURES 2 and 9), the bracket 74 is suspended from a pair of pivot supports in the form of screws 79 which extend through apertures at the tops of the side walls into threaded recesses 80, 81 of the side walls 47 and 48 of the hopper. The hub 75 at the lower end of the bracket 74 supports the shaft 73, the outer ends of which extend beyond the side walls 76 and 77 of the bracket and pivotally support the side walls 71, 72 of the plunger 46 upon bushings 82, 83.

Referring now to FIGURE 9, it will be seen that the shaft 73 is hollow and is counterbored at both ends so as to define a pair of large diameter internal bores 85, 86 interconnected by a small diameter bore 87. A cam follower pin or guide pin 90 is slideably mounted within the shaft 73. This pin has a large diameter end section 91 which extends through an arcuate slot 92 of the hopper side wall 47 and is slideable within a cam slot 100 of a control cam 101. A smaller diameter section 93 of the pin is slideable within the small diameter bore 87 of the shaft 73. At the end remote from the large section 91, the end of the pin is threaded and receives a washer and stop nut 94. A compression spring 95 sandwiched between a shoulder 96 of the internal bore of the shaft 73 and a shoulder 97 of the pin 90 biases the pin outwardly.

Movement of the plunger 46 onto and out of the pocket of the hopper from a withdrawn to an extended position or vice versa, is controlled by movement of the guide pin 90 within the cam track 100 of the cam 101. This cam 101 is fixedly secured to the envelope depository side of the side wall 26 by screws 102.

As may be seen most clearly in FIGURES 3 and 4, the cam track 100 of cam 101 comprises an inner arcuate groove 105, an outer arcuate groove 106 and a pair of interconnecting end grooves 107 and 108. The arcuate grooves 105 and 106 are both struck on an arc of a circle having as its center the axis of the shaft 60 which supports the hopper. Consequently, movement of the guide pin 90 through these two arcuate sections of the cam track does not effect relative movement of the plunger in the hopper. Plunger movement is effected only during movement of the guide pin 90 through the two end sections 107, 108 of the track, as is explained more fully hereinafter.

To preclude the cam follower pin from ever being reversely moved (or moved in a reverse direction from the proper direction) through the cam groove 100, locking teeth or ratchet teeth are machined into the groove 100. Specifically, these teeth are defined by inclined surfaces 110 which interconnect deep sections 111 of the cam groove 100 with shallow sections 112. A transverse arcuate surface 113 defines the interface or interconnecting surface between each of the deep sections 111 and shallow sections 112. These transverse surfaces 113 extend parallel to the axis of the pin 91 so that the pin cannot move over these surfaces in a reverse direction. Otherwise expressed, the pin can only move in one direction through the cam track; this direction being from the bottom of the arcuate section 106 of the cam track (FIGURE 2) to the top of the arcuate section 106 (FIGURE 3), downwardly through the section 108 of the track (from the position illustrated in FIGURE 3 to the position illustrated in FIGURE 4), and downwardly through the arcuate section 105 of the track 100 (from the position shown in FIGURE 4 to the position shown in FIGURES 5 and 2). In moving in this direction, the spring biased follower pin 90 moves through the deep sections of the cam track 111 upwardly over the inclined sections 110 to the shallow sections 112, down over the teeth as defined by the arcuate surfaces 113 to the deep sections 111 of the track. The pin cannot ride up over the surfaces 113 from a deep surface 111 to a shallow surface 112 because of the 90° slope of the surface 113 which interconnects the two so that reverse movement of the pin in the cam slot is absolutely precluded.

Movement of the plunger 46 into and out of the pocket is effected by a linkage system actuated in response to opening and closing of the door. This linkage system comprises three interconnected links, 120, 121 and 122. Link 120 is rotatably supported at one end upon the shaft 60 and is pivotally connected at its opposite end to one end of the link 121 by a pivot pin 124. The opposite end of the link 121 is pivotally connected as at 125 to one end of the bellcrank shaped link 122. The opposite end of this link 122 is pivotally connected as at 126 to the inner end of one side 71 of the plunger 46 while medially of its ends, the link 122 is pivotally connected to the side wall 47 of the hopper by a pivot pin 130.

Actuation of the linkage system to effect extension and retraction of the plunger is controlled by a collar 133 nonrotatably mounted upon the shaft 60 and secured thereto by a tapered pin 134. This collar has an arcuate recess 135 cut therefrom so as to define two flat radial surfaces 136 and 137. These surfaces 136 and 137 cooperate with a lug 138 on the hub 139 of the link 120 to limit rotational movement of the link 120 upon opening and closing movement of the hopper.

The sequence of operation of the envelope depository is illustrated in FIGURES 2, 3, 4 and 5. Referring first to FIGURE 2, it will be seen that to open the depository, the handle 56 must be grasped and pulled forwardly. This results in the hopper 45 being pivoted forwardly and the grooves 43 in the top surface of the top wall 49 of the hopper moving beneath the ribs 42 of the frame plate 40. Similarly configured grooves 140 in the outer wall of the plunger 46 also pass beneath these ribs 42 as the extended plunger passes beneath the plate.

During the first 75° of rotation of the hopper, the link 120 rotates forwardly and the plunger remains extended as the cam follower 90 moves upwardly through the arcuate section 106 of the cam track 100.

After approximately 75° of opening movement of the hopper, the leading edge 141 of the lug 138 on the link 120 engages the radial surface 136 of the stationary collar 133. Thereafter, upon continued opening movement of the hopper, the link 120 is held stationary by the collar 133 while the pin 130 and link 122 continue to move downwardly toward the link 120. This relative movement between the links 120 and 122 results in the link 121 forcing the bellcrank shaped link 122 to rotate about its pivot pin 130. As a consequence of this rotation of the link 122 about the pivot 130, the plunger 46 is pulled inwardly by the interconnecting pivot pin 126. The linkage system 120, 121 and 122 is then in position illustrated in FIGURE 4. During this inward movement of the plunger 46, the pin 90 moves through the arcuate slot 92 in the hopper side wall 47 while it continues to follow the downwardly extending section 108 of the cam track 100. When the hopper reaches the fully opened position as illustrated in FIGURE 4, the plunger 46 is completely withdrawn into the hopper pocket so that envelopes may be inserted into the pocket.

Upon closing of the hopper, the links 120, 121, 122 remain in the same relative positions (as illustrated in FIGURE 4) while the hopper is rotated through an arc of approximately 75°. During this initial portion of the closing cycle of the hopper, the follower pin 90 moves through the arcuate section 105 of the cam track and the plunger remains fully withdrawn in the hopper recess. After approximately 75° of closing movement of the hopper, the trailing edge 143 of the lug 138 on link 120 abuts against the radial surface 137 of the stationary collar 133. Thereafter, upon further closing movement of the hopper, the link 120 is held stationary while the pivot pin 130 and the connected link 122 are forced rearwardly with the hopper. This relative movement results in the link 122 being forced by the link 121 to rotate in the counterclockwise direction as viewed in FIGURE 5. This counterclockwise rotation of the link 122 results in the lower end of the link and the connected pin 126 moving in a counterclockwise direction so as to force the attached plunger 46 to move outwardly from the position illustrated in FIGURE 5 to the position illustrated in FIGURE 2. During outward movement of the plunger 46, the pivot pin 90 moves outwardly in the arcuate slot 92 of the hopper wall 47 while continuing to follow the end section 107 of the cam track 100.

As may be seen in FIGURES 2 and 5, a tension spring 150 is connected at one end 151 to the frame side wall 26 and at the opposite end 152 to the side wall 47 of the hopper. This spring acts as a counterbalance to assist both opening and closing of the hopper. Because of the location of the spring anchor pin 151 in the frame wall 26, the spring is extended both when the hopper is fully closed and when it is fully opened. Therefore, it tends to pull the hopper upwardly or toward the open position upon initial opening of the hopper and downwardly or toward the closed condition upon initial closing.

One of the favorite tricks or devices used by thieves to burglarize night depositories is that of applying an adhesive to the bottom surface of the hopper pocket. After a deposit is made by a customer, the thief opens the hopper in the expectation that envelopes or deposits will remain adhered to the bottom wall of the hopper and will not fall into the chute or safe.

Another favorite trick of thieves is to lower a net into the chute to catch deposits. After several deposits have been made, the thief pulls the net and its contents upwardly into the hopper and then opens the hopper to extract the contents.

The depository unit of this invention defies both of these burglarizing techniques by maintaining the bottom wall or plunger of the hopper extended during opening of the hopper until the outer surface of the bottom wall has passed beneath and is located in juxtaposition to the arcuate frame plate 40. During this opening movement, the grooves 140 in the outer surface of the plunger pass beneath the ribs 42 of the frame plate 40 so as to insure that not even a thin envelope can be adhered to the top surface of the plunger without being wiped off of the plunger surface by the frame plate 40.

One of the most common difficulties experienced with an envelope depository occurs as a consequence of envelopes becoming jammed between the depository hopper and the depository frame. This jamming usually occurs as a consequence of an envelope being only partially inserted into the depository receptacle or hopper. If only partially inserted, the envelope extends beyond the trailing top corner 160 of the depository receptacle so that upon closing of the depository hopper, the envelope becomes jammed between the trailing corner 160 of the hopper top wall 49 and the front edge of the frame plate 40. This condition is illustrated in FIGURE 6 in which a jammed envelope is illustrated in phantom and designated by the numeral 161.

To prevent jamming of a partially inserted envelope upon closing of the hopper, the invention of this application includes an interlock operable to prevent further closing of the hopper upon detection of this condition. This interlock comprises a pair of locking abutments 162, 163 engageable with the hopper to limit closing movement, and a pair of bellcrank shaped cams 164, 165 engageable with partially inserted envelopes. Both the abutments 162, 163 and the cams 164 and 165 are non-rotatably keyed to a support shaft 166. This shaft extends between and is rotatably supported in a pair of vertical lugs 168, 169 attached to the top of the arcuate frame plate 40 of the depository. As may be seen most clearly in FIGURES 6 and 7, the bellcrank shaped cams 164, 165 extend downwardly from the shaft 166 through apertures 170 in the frame plate 29 and apertures 171 in the top plate 40. The lower ends 174, 175 of the cams form extensions of two of the ribs 42 of the upper frame plate 40 and fit into two of the grooves 43 of the upper plate 49 of the hopper.

A tension spring 180 is connected at one end to the top of the abutment bar 163 and at its opposite end to a bracket 181 attached to the depository frame. This spring 180 biases the abutments 162, 163 upwardly away from and out of contact with the hopper plunger 46. An adjustment screw 183 extends through a top flange 184 of at least one of the cams 164, 165 so as to limit upward movement of the abutment bars 162, 163.

In operation, an improperly located or partially inserted envelope in the depository receptacle is detected by engagement of the envelope with the leading edge of one or both of the cams 164, 165. When entrapped between the trailing edge 160 of the hopper frame plate 49 and the leading edge of the cams 164, 165, the envelope forces one or both of the cams upwardly in a clockwise direction about the axis of the supporting shaft 166 as viewed in FIGURE 6. This results in movement of the shaft 166 and of the attached abutment bars 162, 163 which are thereby caused to rotate in a clockwise direction (as viewed in FIGURE 6) against the bias of the spring 180. When rotated in a clockwise direction, outer depending fingers 187 of the bars 162 and 163 are moved inwardly into engagement with recesses 188 in the top edge of the side walls 47 and 48, thereby locking the hopper against continued closing movement.

In moving from a fully opened position (as viewed in FIGURE 4) to a partially closed position in which the hopper is restrained against further closing movement by engagement of the fingers 187 in recesses 188 of the side walls, the cam follower pin 90 does not pass up over one of the inclined surfaces 110 or ratchet teeth of the cam track 100 so that the depository hopper is still free to be reopened. Thus upon detection of an improperly inserted envelope and actuation of the envelope interlock, the depository cannot be forced closed but is still free to be reopened so that the envelope may be correctly repositioned in the hopper and the depository then closed.

Bag depository unit

The bag depository section 12 of the unit functions in much the same manner as the envelope depository to permit articles to be inserted into a chute connected to the rear opening 23 of the frame. Generally, it comprises a hopper 200 mounted within the frame 20 between the side wall 27 and the divider wall 28 of the frame. Mounted within the hopper 200 is a movable plunger 201 which functions as the bottom wall of the hopper receptacle and is movable to force articles from the hopper.

The bag depository section of the unit is housed within the frame 20 between the upper wall 29, the lower wall 30, the side wall 27, and the divider wall 28. As in the envelope depository, the arcuate upper frame plate 41 is mounted beneath the top wall 29 and is cooperable with the upper wall 204 of the hopper to preclude access to the interior of the depository as is explained hereinafter.

Generally, this upper frame plate 41 extends between the side wall 27 of the depository and the divider wall 28 and is welded or otherwise fixedly secured to the top wall 29 of the frame. It has depending ribs 42 which extend into the grooves 43 in the top wall 204 of the hopper and the outer wall 205 of the plunger.

The reinforcing bracket 35 is mounted on the top of the bottom wall 30 of the frame immediately behind the lower front wall 32. Arcuate section 34 of this bracket extends inwardly and upwardly into a recess defined in the bottom of the hopper 200.

The hopper 200 comprises a front wall 210, the top wall 204, a bottom wall 212 and a pair of side walls 213 and 214. These walls are all part of a unitary aluminum casting. Similarly, the plunger 201 is made from a unitary aluminum casting. It comprises an outer wall 215 from which depend a pair of spaced side walls 216, 217.

An aluminum handle 218 is secured to the top of the front wall or door 22 of the hopper 200 by forcing a groove 219 in the bottom of the handle down over the top 220 of the front wall 210. This handle has a rearwardly extending horizontal flange 221, the rear of which abuts against a resilient bumper 222 on the frame when the hopper is fully closed. A sheet of decorative steel or stainless steel 223 is preferably mounted on the front of the front plate 210 of the hopper.

The hopper is pivotally mounted upon a nonrotatable shaft 225, the opposite square ends 226, 227 of which are mounted within square recesses 228, 229 of bosses secured to the inside of the frame walls 27, 28 respectively. Bushings 230, 231 are mounted within the side walls 213, 214 of the hopper 200 and are rotatable over the shaft 225 so as to enable the hopper to be rotated about the nonrotatable shaft 225.

The receptacle or pocket of the hopper is defined by the rear wall 212, a front wall 235, the side walls 213, 214 and the top surface of the outer wall 215 of the plunger. To permit relative sliding movement of the plunger within the front, rear and side walls of the hopper and to prevent envelopes and other articles from becoming jammed between the plunger and the hopper wall, the front and rear walls 212 and 235 both have a plurality of ribs 236, 237 machined therein which function as slideways for grooves 238 machined in the leading and trailing sides of the plunger. To further guide the movement of the plunger within the hopper, a pair of ways 240, 241 are bolted to side walls 213, 214 of the hopper. Grooves 242, 243 in the side walls 216, 217 of the plunger fit over these ways and guide the plunger during linear movement within the hopper.

Movement of the plunger over the ways 240, 241 from the position illustrated in FIGURE 10 to the position illustrated in FIGURE 13, and vice versa, is controlled by an arcuate cam 250 and an interconnecting linkage system 251. This linkage system comprises a cam follower support bracket 252, and a series of links 254, 255 and 256 which interconnect the cam follower bracket 252 to the plunger 201.

Referring now to FIGURES 15, 16 and 18, it will be seen that the cam follower bracket 252 is pivotally supported from a pair of lugs 260, 261 which depend from the bottom of the lower wall 212 of the hopper. A pivot pin 262 extends between these two projections 260, 261 and rotatably supports the bracket 252 so that the bracket is free to pivot on the pin 262.

A crossbar or central section 265 of the bracket 252 has an axially movable cam follower pin 266 mounted in a bore 267 which extends transversely through the section. A large diameter end section 268 of this pin extends transversely from one end of the bracket. A smaller diameter section 270 of the pin is slideably mounted within a smaller diameter bore 271 of the bracket. The pin is biased outwardly in the bracket by a compression spring 273 mounted within the large diameter section of the bore between the end of the large diameter section 268 of the pin and a shoulder formed between the large and small diameter portions of the bore.

The bracket 252 also supports a cam follower roller 275 rotatably journalled upon a radially extending arm 276 of the bracket. Another arm 277 of this bracket is generally yoke-shaped and supports a pin 278 between the two legs of the yoke. This pin pivotally supports one end of the link 254 in the linkage system 251. A third radially extending arm 280 of the bracket is also generally yoke-shaped and pivotally supports one end of the cylinder 284 of a conventional pneumatic dashpot 285.

The piston rod 286 of the dashpot 285 is pivotally connected to a shaft 287 which extends between two depending legs 288, 289 of the hopper. A compression spring 290 is mounted over the piston rod 286 between the end of the cylinder 284 of the dashpot and the shaft 287 so as to bias the piston rod 286 of the dashpot outwardly, or otherwise expressed, to extend the dashpot. As is explained more fully hereinafter, this dashpot functions as a shock absorber to preclude excessive impact at the ends of opening and closing motions of the hopper and as a spring motor to bias the cam follower bracket 252 in a counterclockwise direction (as viewed in FIGURE 14) of rotation about the pivot pin 262.

A second pneumatic dashpot 310 is pivotally connected at one end to the shaft 287 and at the opposite end to a pin 311 anchored in the side wall 27 of the depository frame. This dashpot has bleed holes located in opposite ends of the cylinders and functions in the conventional manner to limit the speed at which the hopper may be opened and closed.

As may be seen most clearly in FIGURES 10 and 15, the link 254 is generally L-shaped and has one end pivotally connected by the pivot pin 278 to the arm 277 of the bracket 252 and the opposite end pivotally connected to a projection 297 which depends from a cross bar section 298 of the link 255. This cross bar section 298 extends between and is rigidly connected to legs 299, 300 of the generally H-shaped link 255. These legs 299, 300 are both pivotally connected at their lower ends to the side walls 213, 214 of the hopper by pivot pins 301, 302. At their upper ends, both legs 299, 300 are pivotally connected by pivot pins 303, 304 to the lower ends of the links 256, 257. The links 256, 257 are in turn pivotally connected by pivot pins 305, 306 to depending legs 307, 308 of the plunger 201.

The cam 250 which controls raising and lowering of the plunger 201 within the hopper 200 is generally arcuate in shape and is fixedly secured to the divider wall 28 of the depository frame. This cam comprises an arcuate main body section 315 and a pair of end sections 317, 318. An arcuate rib 316 is secured to the outer edge of the body section 315. The upper end section 317 of the cam is generally triangular in shape and is machined from and integral with the main body section 315. The lower section 318 of the cam is in the form of a generally triangular block attached to the main body section 315 by screws 319.

Intermediate its ends, the main body section 315 of the cam has ratchet type teeth machined therein which cooperate with the cam follower pin 266 to form a ratchet and pawl type mechanism to limit movement of the pin over the teeth to a uni-directional movement. In this way, the hopper is precluded from being opened after it has been partially closed as is explained more fully hereinafter.

As may be seen most clearly in FIGURES 12, 13A, 15 and 16, the teeth of the cam 315 comprise recesses machined in the radial surface of the cam. These recesses define flat deep cam follower surfaces 320, inclined surfaces 321, flat raised surfaces 322 and transverse flat surfaces 323 which extend parallel to the axis of the pin 266 and interconnect the raised surfaces 322 to the deep surfaces 320 of the recesses. As the pin 266 moves over these teeth, it is forced inwardly into the bracket 252 by the inclined surfaces 321. After passing over a raised surface 322 and dropping into the next following deep surface, the extended pin is precluded against moving upwardly over the cam track by the transverse surface 323.

To assist in initiating opening and closing movement of the hopper, a tension spring 325 is connected at one end to the lower end of the leg 288 of the hopper and at its opposite end to the divider wall 28 of the depository frame. As may be seen most clearly in FIGURES 10 and 12, this tension spring is fully extended in both the opened and closed position of the hopper. Consequently, it acts as a counterbalance to assist in opening and closing of the hopper.

In operation, the hopper is opened by pulling the handle 218 of the hopper forwardly so as to cause the hopper to pivot forwardly about the pivot shaft 225. During the initial opening of the hopper as it rotates through an arc of approximately 100° from the position illustrated in FIGURE 10 to the position illustrated in FIGURE 11, the cam follower roller 275 and the cam follower pin 266 both pass upwardly over the outside surface or cam surface 330 of the cam 250. During this pivotal movement of the hopper through approximately 100°, the plunger 201 remains extended and consequently remains in juxtaposition to the frame plate 41 so that it effectively blocks entry to the depository chute through the front opening of the bag depository.

After the hopper has rotated through approximately 100° and is subsequently moved through the next 20° from the position of FIGURE 11 to the position of FIGURE 12, the plunger is lowered. During this lowering of the plunger 201, the lower wall 212 of the hopper is in a blocking position between the front frame opening and the hopper chute.

Lowering of the plunger is effected as a consequence of the cam roller 275 engaging and being forced upwardly by the outer surface 331 of the triangular end section 317 of the cam 250. Simultaneously, with the engagement of the cam follower roller 275 with the angulated cam surface 331, the cam follower pin 266 rides off of the end 332 of the rib 316 of the cam so that upon subsequent movement of the roller 275 up the cam surface 331, the cam support bracket 252 is caused to pivot in a clockwise direction about the supporting pin 262. This clockwise rotation of the cam supporting bracket 252 results in the link 254 being forced downwardly as viewed in FIGURES 11 and 12. Downward movement of the link 254 results in the generally H-shaped link 255 being caused to pivot in a counterclockwise direction about its supporting pivot posts 301, 302. Rotation of the link 255 in a counterclockwise direction about the posts 301, 302 causes the links 255, 256 and 257 to move from a generally co-linear position (illustrated in FIGURE 11) to an angulated condition (illustrated in FIGURE 12) in which the plunger 201 is pulled inwardly into the recess defined in the hopper. The roller 275 continues to ride up the inclined surface 331 until the plunger 201 is fully retracted and its inner edges abut against rubber seats 338, 339 attached to ledges 340, 341 at the inner ends of the upper and lower walls of the hopper recess.

Upon closing of the hopper, the plunger 201 remains withdrawn in the hopper recess as illustrated in FIGURE 13 while the cam follower pin 266 rides over the inside cam surface 342 of the rib 316. This rib holds the follower pin 266 down as the pin rides over the inner surface 342 of the rib until after the cam follower pin 266 has passed off of the lower tapered end surface 343 of the rib 316.

As the cam follower pin 266 moves downwardly, it passes over the ratchet teeth defined by the surfaces 320, 321, 322 and 323 of the cam 315. Consequently, the hopper cannot be partially closed with the plunger withdrawn and then reopened while the plunger remains withdrawn so as to facilitate access by a thief to the depository chute or bottom opening 23.

When the hopper is within approximately 15° of being completely closed (as illustrated in FIGURE 14), the cam follower pin 266 passes off of the lower end 343 of the cam rib 316 and the cam follower roller 275 engages the upper end of the cam surface 344 of the cam block 318. As illustrated diagrammatically in FIGURE 14A, continued closing movement of the hopper after the cam roller 275 engages the cam surface 344, results in the cam support bracket 252 being rotated in a counterclockwise direction. As the bracket 252 is rotated in a counterclockwise direction by continued closing movement of the hopper, the link 254 of the linkage 251 is forced toward the door. This results in the H-shaped link 255 being caused to pivot about its lower pivot posts 301, 302 so that the links 255, 256 and 257 are moved from an angulated condition (FIGURE 14) to generally co-linear extended position (FIGURES 10 and 14A). This movement of the links 255, 256 and 257 results in the plunger 201 being extended so as to eject the contents of the hopper recess into the rear of the hopper frame so that they may then fall through the opening 23 into the chute (not shown) leading to the receiving safe.

As the roller 275 is caused to roll down the inclined surface 244 of the cam block 318 it rotates the cam support bracket 252 in a counterclockwise direction about the supporting pivot pin 262. The pivot pin 266 is thereby moved from the position illustrated in phantom at 350 in FIGURE 14A to the position designated by the numeral 351. Subsequently, the pin 266 is maintained in this position by the compression spring 290 of the pneumatic dashpot 285 so that upon subsequent opening movement of the hopper, the pivot pin is moved into engagement with and follows the outer cam surface 330 of the rib 316. So long as the pin 266 is engaged with the cam surface 330, the plunger 201 is maintained in an extended position during opening of the hopper 200.

While only a single preferred embodiment of our invention has been illustrated and described herein, those persons skilled in the arts to which this invention pertains will readily appreciate numerous changes and modifications which may be made without departing from the spirit of our invention. Therefore, we do not intend to be limited except by the scope of the appended claims.

Having described our invention we claim:

1. A depository comprising
a frame having a front opening and a bottom chute opening, said frame including an upper arcuate frame plate,
a hopper pivotally mounted near its front bottom edge in said frame, said hopper having a front door panel and a housing extending rearwardly from said front door panel, said housing including a pair of side walls and a top wall, said top wall extending rearwardly from said front door panel and being generally arcuate in configuration, said top wall being located in juxtaposition to said arcuate frame plate when said hopper is in a closed position,
said hopper housing having a recess located therein, said hopper recess being defined in part by a rear wall of said housing,
a plunger mounted in said recess and forming the bottom of said recess, said plunger having an arcuate top surface which, when said plunger is extended, forms a continuation of the arcuate top wall of said hopper housing,
means supporting said plunger for linear sliding movement within said recess between a first position in which said arcuate top surface of said plunger resides completely within said recess substantially beneath the top of said rear wall and a second position in which said plunger is extended and the top surface forms a continuation of the arcuate top wall of said hopper housing,
a cam fixed to said frame, said cam being interconnected to said plunger by a mechanical linkage system so that said cam and linkage system control raising and lowering of said plunger in response to opening and closing of said door panel.

2. The depository of claim 1 which further includes means to prevent damage to an improperly inserted envelope in said hopper upon closing of said hopper, said envelope damage preventing means including a lock operable upon detection of an improperly inserted envelope in said hopper to prevent said hopper from being closed to a position in which said hopper top wall is located in juxtaposition to said upper frame plate.

3. The depository of claim 2 wherein said lock is mounted upon said frame and is movable into engagement with said hopper in response to detection of an improperly located envelope in said hopper recess.

4. The depository of claim 3 in which said lock includes a cam element located in the path of travel of an improperly located envelope in said hopper recess and operable upon engagement with said improperly located envelope to cam an abutment into engagement with said hopper so as to prevent continued closing of said hopper.

5. The depository of claim 2 wherein said lock comprises a shaft pivotally mounted in said frame above said depository hopper, said shaft having at least one cam element depending therefrom, said cam element being located in the path of travel of an envelope improperly located in said recess of said depository hopper, said shaft also having an abutment element depending therefrom and movable into engagement with said hopper in response to contact of said cam element with an envelope so as to lock said hopper against further closing movement.

6. The depository of claim 5 wherein said upper frame plate has a plurality of depending ribs thereon, said hopper top wall having a plurality of grooves, said ribs being slideable within said grooves upon opening and closing of said hopper, said cam element of said lock being located at the front end of one of said ribs so as to form a continuation of said rib and extend downwardly into one of the grooves of said hopper top wall.

7. A depository comprising
a frame having a front opening and a bottom chute opening, said frame including an upper arcuate frame plate,
a hopper pivotally mounted in said frame near its front bottom edge, said hopper having a front door panel and a housing extending rearwardly from said front panel, said housing including a pair of side walls and a top wall and a rear wall, said top wall being generally arcuate in configuration and terminating short of said rear wall so as to define a recess therebetween, said top wall being located in juxtaposition to said arcuate frame plate when said hopper is in a closed position, and the top of said rear wall being located adjacent said arcuate frame wall when said hopper is in an open position,
a plunger movably mounted in said recess, said plunger having a top surface which, when extended, forms a continuation of the arcuate top wall of said hopper housing,
means supporting said plunger for linear sliding movement within said recess between a first position in which said arcuate top surface of said plunger resides completely within said recess and substantially below the top of said rear hopper wall, and a second position in which said plunger is extended and the top surface forms a continuation of the arcuate top wall of said hopper housing,
a cam fixed to said frame, said cam being interconnected to said plunger by a mechanical linkage system so that said cam and linkage system control raising and lowering said plunger in response to opening and closing of said door panel, said cam and linkage being operable to lower said plunger into said recess upon opening of said hopper only after said hopper is nearly completely open and said rear wall of said hopper is blocking entry to the frame chute through said frame front opening, said cam and linkage being operable to raise said plunger in said recess upon closing of said door so as to push articles from said recess upon closing of said hopper only after said hopper is nearly completely closed and said arcuate wall of said hopper is blocking entry to the frame chute through said frame front opening.

8. The depository of claim 7 which further includes means to prevent damage to an improperly inserted envelope in said hopper upon closing of said hopper, said envelope damage preventing means including a lock operable upon detection of an improperly inserted envelope in said hopper to prevent said hopper from being closed to a position in which said hopper top wall is located in juxtaposition to said upper frame plate.

9. The depository of claim 8 wherein said lock is mounted upon said frame and is movable into engagement with said hopper in response to detection of an improperly located envelope in said hopper recess.

10. The depository of claim 9 in which said lock includes a cam element located in the path of travel of an improperly located envelope in said hopper recess and operable upon engagement with said improperly located envelope to cam an abutment into engagement with said hopper so as to prevent continued closing of said hopper.

11. The depository of claim 8 wherein said lock comprises a shaft pivotally mounted in said frame above said depository hopper, said shaft having at least one cam element depending therefrom, said cam element being located in the path of travel of an envelope improperly located in said recess of said depository hopper, said shaft also having an abutment element depending therefrom and movable into engagement with said hopper in response to contact of said cam element with an envelope so as to lock said hopper against further closing movement.

12. In an envelope depository comprising
a frame having a front opening and a bottom chute opening, said frame including an upper frame plate,
a hopper movably mounted in said frame, said hopper including a baffle operable to preclude entry to the frame chute through said frame front opening when said hopper is open, said hopper further including a top wall plate located in juxtaposition to the upper frame plate when said hopper is closed, the improvement which comprises
means to prevent damage to an improperly inserted envelope in said hopper upon closing of said hopper, said envelope damage preventing means including a lock operable upon detection of an improperly inserted envelope in said hopper to prevent said hopper from being closed to a position in which said hopper top wall plate is located in juxtaposition to said upper frame plate.

13. The envelope depository of claim 12 wherein said lock comprises an abutment movably mounted upon said frame, said abutment being movable into engagement with said hopper to preclude closing of said hopper.

14. The envelope depository of claim 13 wherein said lock actuating means comprises a cam movably mounted upon said frame, said cam being located in the path of travel of an envelope improperly located in said hopper.

15. The envelope depository of claim 14 wherein one of said plates has a plurality of ribs thereon and the other plate has a plurality of grooves adapted to receive said ribs, said cam being located at the front end of said frame plate and co-linearly aligned with one of said grooves.

16. The depository of claim 1 wherein said linkage system comprises
a bracket pivotally supported at one end by said hopper,
a cam follower shaft pivotally supported in the opposite end of said bracket, said shaft having a portion extending through one of said side walls of said hopper and engageable with said cam, said plunger being pivotally supported upon said shaft.

17. The depository of claim 16 wherein said hopper is rotatably supported upon a shaft which is nonrotatably supported by said frame, said linkage system further comprising
- a first link pivotally supported at one end upon said shaft,
- a second link pivotally connected at one end to said first link and at the opposite end to one end of a third link,
- said third link being pivotally connected at its other end to said plunger and pivotally connected medially of its ends to one side wall of said hopper, and
- a collar nonrotatably mounted upon said shaft and operable to limit rotation of said first link relative to said shaft.

18. The depositry of claim 1 wherein said cam comprises a generally arcuate main body section, an arcuate rib section attached to one side of said main body section, and a pair of cam elements located at the opposite ends of said arcuate main body section.

19. The depository of claim 18 wherein said linkage system comprises a pivotally supported bracket,
- a first cam follower element mounted in said bracket and movable over opposite sides of said arcuate rib section of said cam and
- a second cam follower element mounted in said bracket and engageable with said cam elements at the opposite ends of said main body section of said cam, said second cam follower element being operable to control oscillation of said bracket upon engagement with said cam elements.

20. The depository of claim 19 wherein said mechanical linkage system further comprises at least three articulately interconnected links, one of said links being connected to said bracket and another of said links being connected to the bototm of said plunger.

21. The depository of claim 19 which further includes an air cylinder dashpot interconnected between said bracket and said frame to limit opening and closing rates of movement of said plunger.

22. The depository of claim 1 which further comprises an air cylinder dashpot connected at one end to said frame and at the opposite end to said hopper so as to limit opening and closing rates of movement of said hopper.

References Cited
UNITED STATES PATENTS

| | | | |
|---|---|---|---|
| 2,563,150 | 8/1951 | Behrens | 232—43.3 |
| 2,617,584 | 11/1952 | Behrens | 232—44 |
| 2,901,165 | 8/1959 | Krug | 232—44 |
| 2,921,735 | 1/1960 | Blauvelt | 232—44 |
| 3,028,074 | 4/1962 | Graber et al. | 232—44 |
| 3,114,499 | 12/1963 | Graber et al. | 232—44 |

FRANCIS K. ZUGEL, Primary Examiner

U.S. Cl. X.R.

232—43.3